Fig. 3.

April 1, 1941. W. J. FINNEGAN 2,237,256
METHOD AND APPARATUS FOR MULTISTAGE FREEZING OF COMESTIBLES
Filed Oct. 11, 1937 8 Sheets-Sheet 6

Fig. 4.

Inventor
W. J. Finnegan
By
Attorney.

Fig. 4A.

Patented Apr. 1, 1941

2,237,256

UNITED STATES PATENT OFFICE 2,237,256

METHOD AND APPARATUS FOR MULTI-STAGE FREEZING OF COMESTIBLES

William J. Finnegan, Los Angeles, Calif.

Application October 11, 1937, Serial No. 168,507

20 Claims. (Cl. 62—102)

This invention relates to a certain new and useful method and apparatus for rapid refrigerating, freezing and handling of comestibles.

The primary object of the invention resides in the provision of an improved method and portable apparatus for rapid freezing and handling of food products and other materials to be subjected to a similar treatment and in which the processed comestible or other material retains its original appearance and quality.

In prior methods and apparatus used for a like purpose a considerable loss of product weight occurred during the freezing process, due to the required large temperature difference existing between the refrigerant and secondary heat transferring vehicle, and the required large temperature rise of the secondary heat transferring vehicle during its passage over the product being treated, in conjunction with a relatively high velocity of the secondary heat transferring vehicle in contact with the product being treated. It is therefore, another object of the invention to provide an efficient means for substantially reducing the temperature difference between the refrigerant and secondary heat transferring vehicle, and temperature rise of the secondary heat transferring vehicle during its passage over the product being treated, thereby improving the appearance and increasing the weight of the finished product.

A further object of this invention is to provide a means for substantially reducing the quantity of recirculated air required and greatly reducing the quantity of air recirculated, thereby reducing the initial amount of frost accumulation on the heat transferring surfaces and effecting a substantial saving in power required for recirculating the air used as a secondary heat transferring vehicle.

In the rapid freezing of various fruits and vegetables it has been found that the resistance offered to the flow of air through the pack varies considerably with the different kinds of product and arrangement of pack on the freezing belt. This condition greatly reduces the amount of air circulated through some products and through the resulting increase in air pressure the power consumption is substantially increased, therefore another and important object of this invention is to provide a means for maintaining a constant volume of recirculated air at a constant pressure thereby increasing the rate of heat transfer and effecting a substantial saving in power.

Another and important object of this invention is to provide a means for minimizing the amount of frost accumulation on the heat transferring surfaces and a rapid means for removing frost from the heat transferring surfaces thereby rendering the freezing process more economical and efficient.

A further object of this invention is to provide an effective means for trapping and equalizing the distribution of the refrigerated recirculating air within the apparatus and minimize the amount of atmospheric air entering the apparatus thereby reducing the amount of refrigeration required and effecting a saving in power.

Another important object of the invention is to provide a means for alternately reversing the directional flow of the refrigerated recirculating air over the product being treated and alternately cooling the refrigerated recirculating air before and after the air passes through the product pack, thereby multistaging the freezing also the air cooling processes, which in turn decreases the time required to freeze the product, increases the capacity of the apparatus and renders the freezing process more economical and efficient.

It is known to all skilled in the art that the frost accumulation on the surrounding surfaces forming the produce inlet and outlet openings in a freezing apparatus or chamber causes considerable difficulty and often delays the freezing process to remove the impediments caused by the heavy frost formations, therefore another and important object of this invention is to provide a means for eliminating frost accumulations on the surrounding surfaces of the product inlet and outlet openings in a freezing apparatus or chamber, thereby improving the operation and efficiency of the freezer.

With the above and other objects in view that will become apparent as the nature of the invention is better understood, the same consists in the novel process, method, form, combination and arrangement of parts hereinafter more fully described, shown in the accompanying drawings and claimed.

Figure 1:
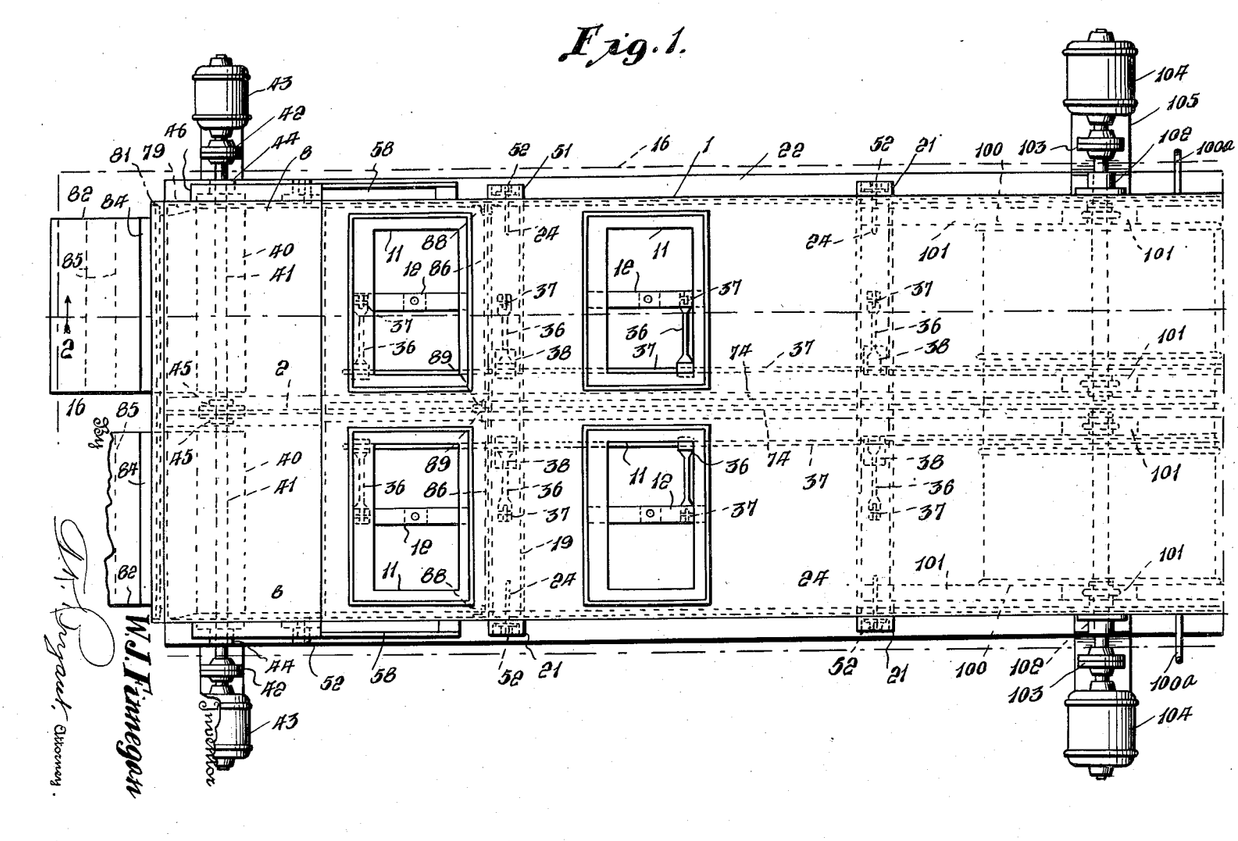
Figures 1 and 1A are match line top plan views of a refrigerating apparatus with insulated covers removed from air circulating housing.
Figure 1A:
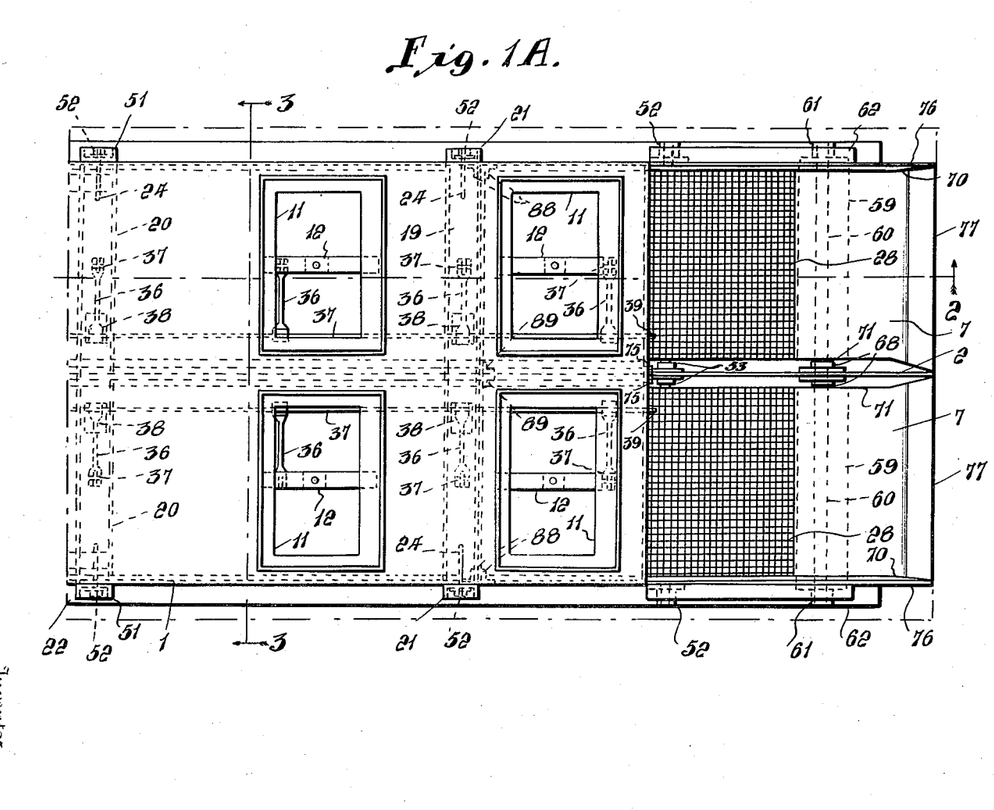
Figure 2:
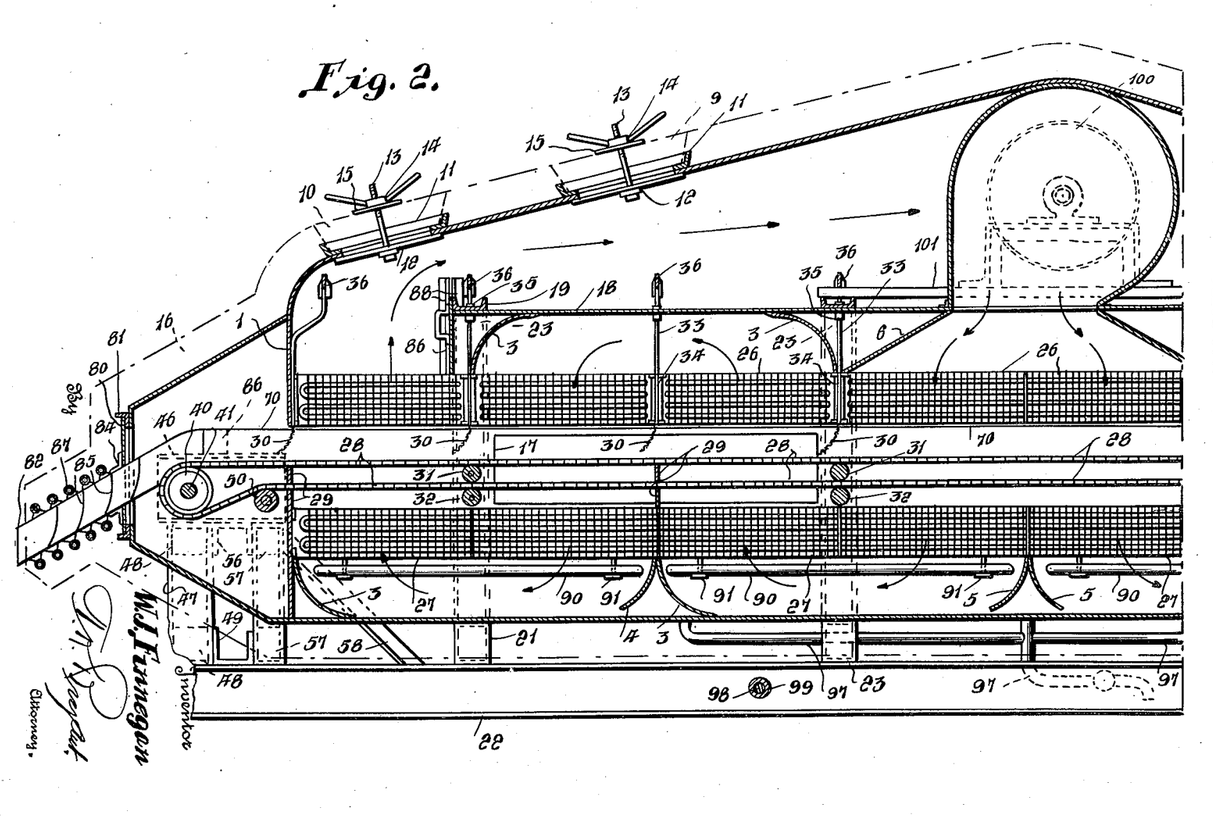
Figures 2 and 2A are match line vertical longitudinal sectional views taken on line 2—2 of Figures 1 and 1A, showing arrangement of feeding end, conveyor belt, harvesting end, heat transferring surfaces, air recirculating fans with air recirculating housing and air recirculating housing with baffles for directing the air flow.
Figure 2A:
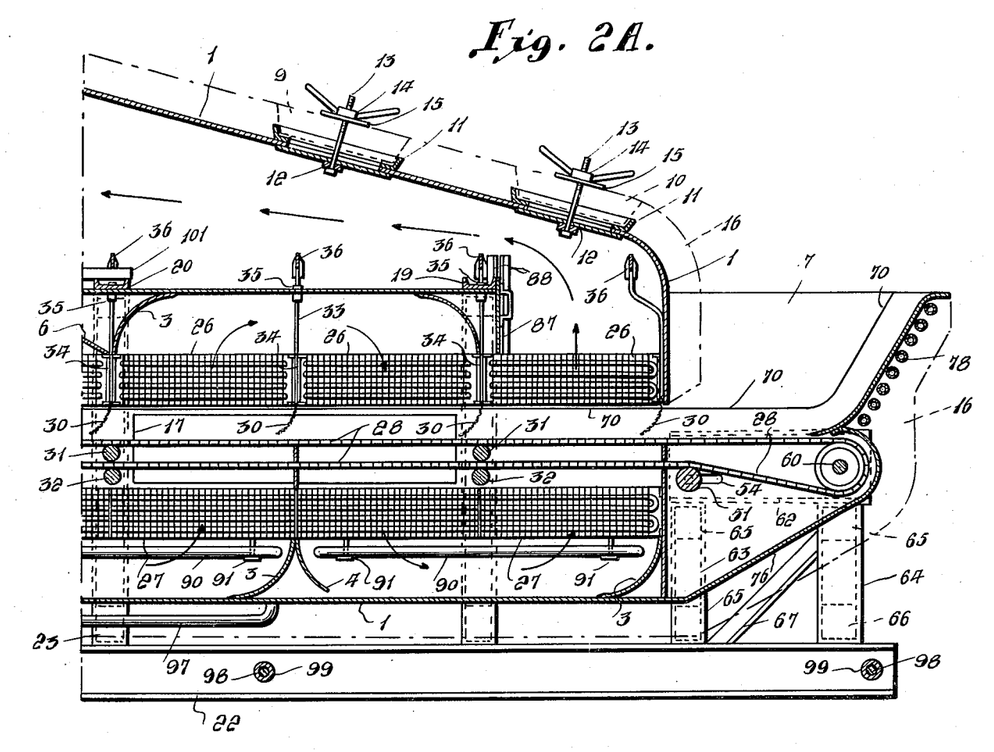
Figure 3:
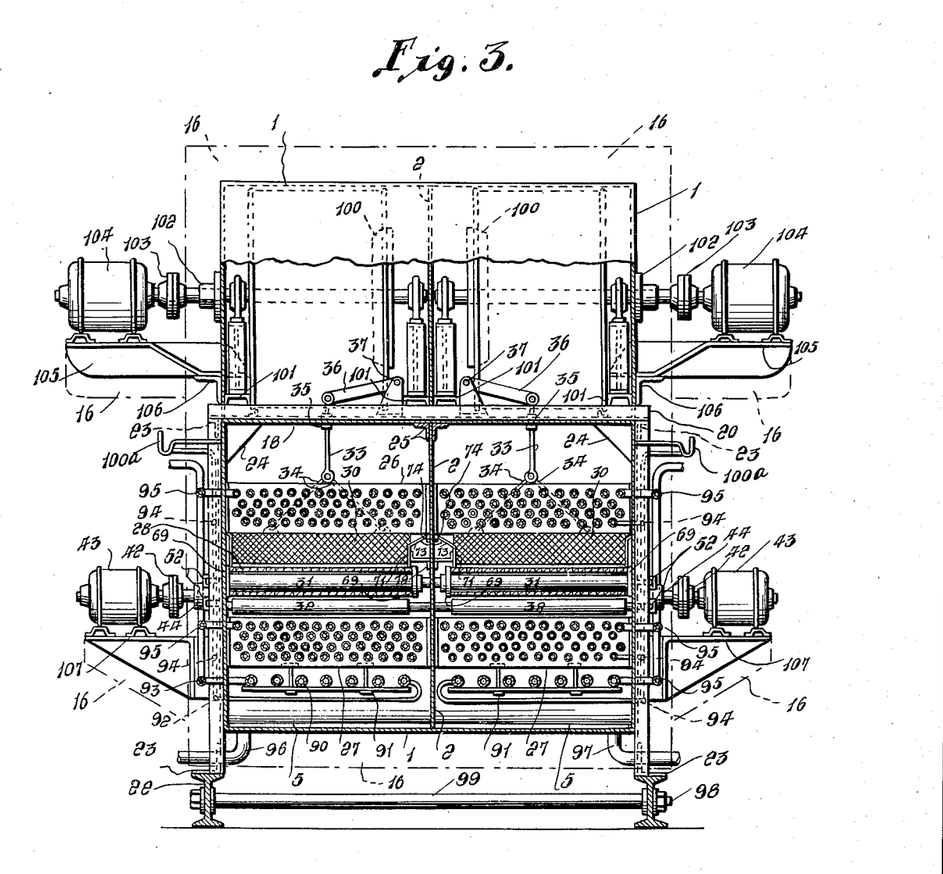
Figure 3 is a vertical cross-sectional end view taken on line 3—3 of Figure 1A of the refrigerating apparatus and shows the arrangement for driving the fans and conveyors, also refrigerant connections, taken on line 3—3 of Figure 1.

The apparatus illustrated in Figures 1 to 3 comprises an air recirculating housing 1 which is fitted with a vertical dividing partition 2, air directional flow baffles 3, 4, 5 and 6, material feeding air lockers 7 and material harvesting air lockers 8 preferably made of sheet steel of welded construction. The housing, with vertical division plate 2 forms two separate air recirculating chambers each having two air tight insulated atmospheric air intake covers 9 and two air tight insulated defrosting air discharge covers 10. All insulated cover openings in housing are formed with angle iron 11 around edges and cross tie bar 12 in center preferably welded in position. The tie bars are fitted with a fixed screw stud 13 and a winged nut 14 with pressure equalizing plate 15 for securing the insulated covers in position. All external surfaces of the air recirculating housing including feeding and harvesting air lockers have insulation 16 preferably of sheet cork, applied in hot asphalt and arranged in two or more courses with water-proof asphalt mastic exterior surface finish. The housing, forming the sides of each air recirculating chamber is fitted with removable insulated cover plates 17 as required for periodical inspection of the interior parts.

The interior of each air recirculating chamber is fitted with a horizontal division plate 18 which is supported by cross channels 19 and 20, the cross channels being supported on vertical channels 21 which rest on and are secured to the foundation I beams 22, the channels being additionally secured and braced by angle pieces 23 and plates 24. The vertical division plate 2 is secured to the horizontal division plate 18 with angle irons 25, all of which is preferably made of steel of welded construction. The horizontal division plate 18 and the sides and bottom plates of the housing 1 forms the two quick freezing chambers in which the refrigerant air cooling evaporating coils 26 and 27 are arranged so as to form recirculating air ducts on top of coils 26 and on bottom of coils 27 with rectangular tubular spaces formed between the two sets of coils 26 and 27 through which the freezing conveyor belts 28 travel. The refrigerant air cooling evaporating coils 26 and 27 are each arranged in eight sections being secured to the housing 1 and division plate 2 and preferably made of steel pipe with extended steel fins secured to pipe coils. The fin surfaces are preferably arranged on approximately one inch centers. Each coil section 26 and 27 is arranged to form a separate vertical recirculating air passage, the air flow being directed through each passage by air baffles 3, 4, 5, 6, 29, 30 and conveyor belt supporting rollers 31 and 32. The air baffles 30 are flexible being preferably made of close mesh stainless steel wire links and is adjustable in respect to height above the freezing conveyor belts 28, being guided on each side and connected to reach-rods 33 by rigid and fixed supporting pieces 34. The reach-rods 33 have guide collars 35 which have sufficient clearance to provide for the traveling angularity of the rods 33 and are attached to the supporting pieces 34 and connecting arms 36 by swivel pins. The connecting arms 36 are fixed to the baffle adjusting shafts 37 by keys and set screws. The shafts 37 are supported by and rotate in the shaft supporting brackets 38 and extend through the air recirculating housing 1 on the feeding end of the apparatus where the shafts are shaped square at point 39 to fit a square socket wrench for adjusting the baffles 30 to the desired position.

The freezing conveyor belts 28 are reticulated and preferably made of tinned copper wire or stainless steel wire woven to form the open mesh reticulation and is driven by the driving pulleys 40 having driving shafts 41 and flexible couplings 42 which are preferably directly connected to variable speed motors 43 or may be directly connected to reduction gears if desired with the reduction gears connected to motor drives. The pulley driving shafts 41 are supported by and run in bearings 44 and 45. Bearings 45 are secured to and supported by division plate 2 and the bearings 44 are secured to and supported by channels 46 which rest on supporting channels 47 being reinforced by angles 48 and 49. All bearings are preferably secured by bolts and lock nuts and all channel supports and reinforcing angles are preferably secured by welding. Each freezing conveyor belt is supported by idling rollers 31, 32, 50 and 51 which have supporting bearings 52 located on each side of the housing 1 and supporting bearings 53 located in the vertical division plate 2. All supporting rollers are preferably made of steel and fitted with roller bearings on each end and all roller supporting bearings are preferably secured by bolts and lock nuts. The supporting roller 51 located on the feeding end of the apparatus has a bearing adjusting covered slots 54 as required for adjusting the tension on the freezer conveyor belts 28. The bearings 52 supporting rollers 50 are secured to channel 46 which rests on the vertical channel supports 47 and 55. This channel is additionally secured to and reinforced by angle irons 49, 56, 57 and 58, channels and reinforcing angles preferably being secured by welding. Idler pulleys 59 are supported by shafts 60 which run in and are supported by bearings 61, the bearings being secured to and supported by horizontal channels 62 which rest on and are secured to the vertical channels 63 and 64. The vertical channels rest on foundation I beams 22 and are additionally reinforced by angles 65, 66 and 67. Shafts 60 also run in and are supported by bearings 68 which are secured to division plate 2. All channel supports and reinforcing angles are preferably secured by welding and all bearings are preferably secured by bolts and lock nuts.

The freezing conveyor belts are guided on each side by lateral motion collars 69 which are supported and run on supporting rollers 31. Guides 70 and 71 are provided as required on the sides of each freezing belt to maintain the product being treated on the belts. Guides 70 are secured to the metal housing 1 and guides 71 are secured to the vertical division plate 2. The produce guides 70 and 71 are preferably made of stainless steel and secured in place with screws and Z shaped distance pieces 72. Air pressure regulating dampers 73 extend through all recirculating air passages in the rectangular freezing tube space and are secured to the damper shafts 74 which extend through the metal housing 1 on the feeding end of the apparatus. The air pressure regulating damper shafts are formed square at point 75 on the ends and fitted to a socket wrench as required for regulating the amount of recirculated air over the produce being treated.

The product feeding air lockers 7 are formed and housed by the metal housing. 76, 77 and vertical division plate 2. The housing section 76 is preferably made of steel and of welded construction. The housing section 77 is preferably made of stainless steel of welded construction. The stainless steel product guides 70 and 71 extend along the sides of the produce feeding sections of the produce freezing conveyor belts and up to the top of the stainless steel housing section 77 as shown in the accompanying drawings. Warm water circulating coils 78 contact and extend over the external surfaces of the stainless steel housing sections 77 as required to warm these sections and thereby prevent frost accumulation on the internal exposed surfaces.

The product harvesting air lockers 8 are formed and housed with the metal housing 79 preferably made of steel of welded construction and fitted with a removable air tight insulated cover plate 80 preferably secured to angle iron frame 81 with screw studs and nuts and sealed with air tight gasket. The cover plate 80 is fitted with insulated product harvesting nozzles 82 preferably made of stainless steel and secured to cover plate by angle iron 83 and 84 preferably by welding. Each harvesting nozzle 82 is fitted with four internal flexible air baffles 85 preferably of similar material and construction as air baffles 30 hereinbefore described. The sides of each harvesting nozzle join and inter-lock with produce guides 70 and 71 at point 86a as shown in the accompanying drawings. Warm water circulating coils 87a contact and extend over the external surfaces of the stainless steel harvesting nozzles 82 as required to warm the metal nozzles and thereby prevent frost accumulation on the internal surfaces of the nozzles and metal surfaces of the air baffles 85.

Return air shut-off dampers 86 and 87 are arranged at each end of the horizontal division plate 18 adjacent the supporting cross channels 19 as required for defrosting the air cooling surfaces 26 and 27. Each damper has angle iron side guides 88 and 89; the dampers being slotted as required to pass the baffle adjusting shafts 37 when they are raised to the air shut-off position where they contact the inside top of housing 1. Each damper is fitted with a hand lifting handle and dampers including lifting handles are preferably made of steel of welded construction. The angle iron side guides 88 are preferably made of steel and welded to the sides of housing 1 and the angle iron side guides 89 are preferably made of steel and welded to the vertical division plate 2.

Recirculated air precooling and dehumidifying coils 90 are arranged in the bottom air ducts formed by the bottom and part of the side plates of housing 1, vertical division plate 2 and the air cooling evaporating coils with fins 27. The precooling coils are supported by hanger straps and screw studs 91, the top end of studs being welded to the fins of coils 27. Refrigerant liquid feed connections 92 and refrigerant gas return connection 93 to and from the air precooling coils 90 are arranged as shown in the accompanying drawings. Refrigerant liquid feed connections 94 and refrigerant gas return connections 95 to and from each section of the refrigerant air cooling evaporating coils 26 and 27 are arranged as shown in the accompanying drawings. Precooling coils, hangers and refrigerant connections to and from precooling coils 90 and refrigerant connections to and from the refrigerant air cooling evaporating coils 26 and 27 are preferably made of steel of welded construction.

Drain pipe connections 96 and 97 are fitted to the bottom plate of housing 1 as to remove water from each air circulating compartment when the heat transferring surfaces are being defrosted. The bottom plate of housing 1 is slightly pitched as required for draining the water from the apparatus. Drain connections are preferably made of steel pipe of welded construction. The foundation I beams 22 are reinforced with liberal size screw studs 98 with nuts and washers also an equalizing distance piece 99 between the I beams, all preferably made of steel.

The air recirculating fans 100, located within the housing 1, are secured to and supported by channels 101 preferably by bolts and lock nuts. Channels 101 are secured to and supported by cross channels 20. Fans are of the single inlet type each taking the inlet air on the ends facing the vertical division plate 2 and discharging the air downwardly through the center freezing compartments. At the fan discharge and located at the top of the center freezing compartment, air pressure gauges 100a are fitted to housing 1. The gauges consist of glass U shaped tubes with a dense calcium chloride brine in the U sections and the glass being graduated and marked to read the pressure in inches of water. Each fan shaft passes through the side of housing 1 and is fitted with an air tight bearing gland 102 and flexible driving coupling 103. The driving couplings are preferably direct connected to electric motors 104. Each motor is mounted on and supported by an insulated reinforced foundation base plate 105. The base plates are secured to and supported by channels 101 and additionally reinforced with angle irons 106, all preferably made of steel of welded construction. The freezing conveyors driving motors 43 are likewise mounted on and supported by insulated reinforced foundation base plates 107. The base plates being secured to and supported by channels 62, 63 and 64 are preferably made of steel and of welded construction.

In the practicing of this rapid freezing method and in the operation of the apparatus shown in Figures 1, 2 and 3 refrigerating effect is first applied to the air precooling coils 90 through liquid refrigerant connections 92 and the refrigerant gas will return to the refrigerant compressor through the refrigerant return connections 93. The air recirculating fans 100 are started and as the air passes over the precooling coils the temperature of the recirculated air is rapidly lowered and the moisture within the air is deposited in the form of frost on the precooling coil surfaces. When the recirculating air temperature is lowered to the optimum freezing temperature of the products to be frozen refrigerating effect is applied to all sections of the air cooling evaporating coils 26 and 27 through liquid refrigerant connections 94, the refrigerant gas being returned to the refrigerant compressor through the refrigerant gas return connections 95.

Circulating water is then applied to the warming coils 78 and 87; this circulating water is preferably taken from the discharge water from the refrigerant compressor's cooling jackets. The freezing conveyor belts are then started at the desired speed as required to completely freeze the products being treated during the passage through the apparatus. The flexible air baffles 30 are regulated to the desired height above the freezing conveyor belts as required to accommodate the products to be treated. The fans are then stopped and the products are fed onto the moving conveyor belts until the entire top surface of the belts within the apparatus has been suitably filled, the conveyors are then stopped and the fans are started again. At this time the air pressure regulating dampers 73 are adjusted and set as desired by the air pressure indicated on the gauges 100a. When the product on the belt has been frozen the freezing conveyor belts are again started and continuous feeding of the products and harvesting of the frozen products from the harvesting nozzles 85 results thereafter.

Upon completion of each freezing period the freezing conveyor belts are stopped, the products on the belts are frozen, the fans are stopped and the belts are again started and run until all frozen products have been harvested from the apparatus. Refrigerant compressor is stopped and liquid refrigerant is shut off from refrigerant air cooling evaporating coils 26 and 27 and circulating water to coils 78 and 87 is stopped. The air pressure regulating dampers 73 are then closed and the flexible air baffles are lowered to a point where they touch the freezing conveyor belts. The air tight insulated covers 9 and 10 located in the top of housing 1 are removed and the air shut-off dampers 86 and 87 are raised to a point where they contact the interior surface of housing 1. The fans 100 are then started and take warm air from the surrounding atmosphere through openings where covers 9 have been removed and deliver the warm air over the sixteen stages of air cooling coils 26 and 27, finally discharging the air from the apparatus into the atmosphere through openings in housing 1 where covers 10 have been removed. The coil sections 26 and 27 including extended heat transferring fin surfaces are rapidly defrosted and the water resulting from the melting frost accumulates in bottom of housing 1 where it is promptly drawn off through drain water connections 97 after all surfaces have been defrosted and fans have been shut down. When insulated covers 9 and 10 are replaced and the drain water connections closed, the apparatus is again ready for efficient operation.

It will be noted that the freezing process progresses in steps and is fully accomplished in eight stages. The recirculated air is recooled in two steps while passing through each freezing stage being initially cooled immediately after picking up heat from the product in each freezing stage and further cooled immediately before being blasted through the product pack in the following freezing stage which results in sixteen stages of air cooling during its passage through one compartment of the apparatus. This method of alternately cooling the recirculated air and partially freezing the product by multistaging the heat transfer required for freezing the product and the heat transfer required for cooling the recirculated air results in a relatively small rise in the temperature of the air during its passage through the product pack in each freezing stage, consequently a more uniform air temperature exists throughout the freezing apparatus.

It will be further noted that the small temperature rise of the recirculated air above described permits the air to be maintained at a very high relative humidity. This conditions reduces the loss in product weight considerably since this loss is due to the evaporation of moisture from the product during the freezing process, and for the same reason less frost is deposited on the air cooling surfaces resulting in more efficient and uniform heat transfer. Moreover the appearance of the finished frozen product is greatly improved since considerably less shrinkage occurs which results from the evaporation of moisture from the product during the freezing process. The air cooling heat transfer surfaces are proportioned to maintain a small mean temperature difference between the refrigerant and the recirculating air to further the condition above disclosed.

Since air is a very poor heat transferring vehicle under normal operating conditions it is necessary to recirculate approximately 2500 cubic feet of air per minute for each ton of refrigerating effect delivered when the air is permitted a rise in temperature 4° F. during its passage over the product. When the circulating air is cooled in multistages as hereinbefore described it is only necessary to recirculate approximately 312 cubic feet while maintaining the same air temperature rise of 4° F. during its passage over the product. This reduction in air circulation effects a power saving of over 85% for recirculating the air while otherwise maintaining improved freezing conditions. These calculations will vary somewhat as the physical conditions of the recirculating air changes.

A constant volume of air is recirculated over the heat transfer surfaces 26 and 27 and this air is maintained at a constant pressure by regulating the air pressure dampers. It is known that various kinds of product and arrangement of product pack on a reticulated freezing belt causes a considerable difference in the frictional resistance offered to a constant volume of recirculated air. For example: It is impossible to force the same volume of air through peas arranged on the freezing belt two inches thick as is possible with strawberries or apricots arranged in the same thickness and with the same air pressure. Under this condition it has been found that less than thirty percent of the air volume will pass through the pea pack as compared to the volume passing through the strawberries and approximately twenty percent in the case of apricots. This condition of operation results in a very large temperature rise in the recirculated air as it passes through such product packs causing loss of product weight through evaporation of moisture from the product, shrinkage of the product due to drying and dehydration and forms heavy frost accumulation on the heat transferring surfaces, necessitates a larger mean temperature difference between the recirculated air and the refrigerant which accelerates the undesirable conditions and increases the power required per unit quantity of refrigerating effect produced.

Since air at a temperature required for freezing comestibles and the like weighs over ten percent more than the normal surrounding atmospheric air, the trapping of the refrigerated recirculated air within the apparatus is believed to be apparent. The elevated housing surrounding the product feeding end forms an effective air lock in space 7 and the flexible metal air baffles 85 located in the harvesting nozzles prevent the refrigerated air from leaving the apparatus. Moreover it will be noted that each air recirculating system is balanced with respect to frictional resistance. The air being initially introduced in the center of the apparatus and passing through an equal number of air cooling and product freezing stages before reaching the return air ducts located at each end of the freezing chambers. This condition of operation further eliminates a large accumulation of frost on the heat transfer surfaces 26 and 27, since warm atmospheric air contains a large quantity of moisture. Moreover a saving in the quantity of refrigeration is effected which results in a substantial saving in power consumption.

In addition to multistaging the heat transfer required for freezing products and multistaging the heat transfer required for cooling the recirculated air, the air is alternately blasted on the top and bottom of the product being frozen during its passage through the freezing compartments. This condition causes the freezing to rapidly progress from both sides of the product and thereby substantially reduces the time required to completely solidify any kind of product. Furthermore the restricted face area of the air cooling surfaces and product freezing belt area in each stage permits the air to travel at a high velocity across the air cooling surfaces and by adjusting the air pressure dampers 73 the highest possible air velocity is maintained through the product pack being frozen which is limited to the point where the air velocity tends to lift the product off the freezing belt on its upward travel. This condition of operation assures a maximum rate of heat transfer from the product to the refrigerant heat transferring surfaces thereby further reducing the time required to freeze the product and improving the quality of products so frozen. Since the product's lifting point due to air velocity, varies considerably with the different kinds of product the many advantages gained by varying the air volume and velocity through the product pack by regulating the air pressure dampers 73 while constantly maintaining the high air velocity over the air cooling surfaces is believed to be obvious.

While general reference is made herein to the quick freezing of products it is to be noted that the method and apparatus is very effective for economically precooling fruits, vegetables and the like, also for congealing or solidifying chemical substances and the like.

It will be noted that the apparatus will handle and freeze two different kinds of product simultaneously. The recirculating air used for freezing each product is sealed within separate air circulating systems, thus eliminating the mixture of odors or gases peculiar to each product being frozen. Independent speed control of each freezing conveyor belt is provided as required to coincide with the time required for freezing each product. Independent air velocity and volume control is provided in each air recirculating system as required for handling and freezing two different kinds of product simultaneously. The flexible air baffles 30 are independently adjusted to suit the requirements of the product in each freezing chamber. Separate feeding and harvesting of the products being treated is provided as required to and from each freezing chamber. By insulating the vertical division plate 2, located between the two freezing chambers, an optimum freezing temperature may be maintained in each freezing chamber for independently treating the different kinds of product.

Cumbersome frost accumulations on the metal surfaces where the product enters and leaves the apparatus is eliminated by contacting the exposed surfaces with pipe coils through which relatively warm water is circulated. It is to be noted that this method of eliminating frost accumulation is applicable to any compartment or chamber in which a temperature below the freezing point of water is maintained. To prevent frost accumulation on the apparatus herein described it is only necessary to raise the temperature of the exposed surfaces slightly above the temperature of the freezing air within the apparatus.

It will be further noted that the entire apparatus is self-contained and substantially portable, requiring only refrigerant pipe and electrical connections. The apparatus may be transported on a truck or trailer and the refrigerant compressor, condenser, receiver and compressor motor with drive may also be transported on a truck or trailer thereby making the complete refrigeration and quick freezing unit a portable plant.

The following is believed to be apparent and the improvements and advantages are believed to be obvious: A minimum quantity of recirculating air is housed within the apparatus and this air is precooled and dehumidified before the freezing process starts. A minimum quantity of frost is deposited on the heat transferring surfaces and this frost can be rapidly removed by the defrosting method hereinbefore described. Separate and independent adjustable control as herein described in conjunction with the portability of the freezing apparatus renders a maximum of flexibility.

Figure 4:
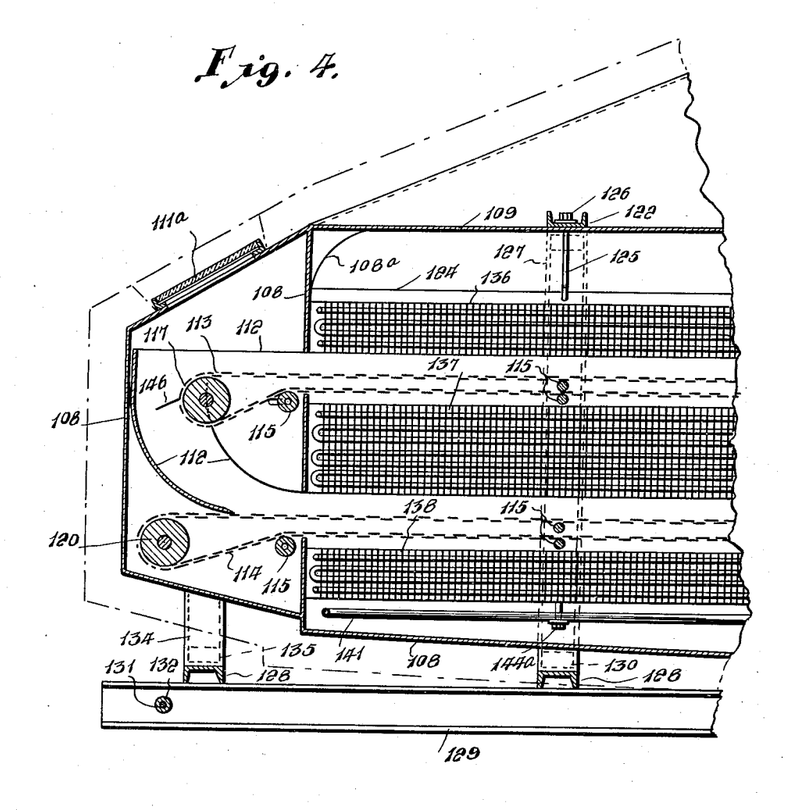
Figures 4 and 4A are vertical longitudinal sectional views of another form of refrigerating apparatus showing arrangement of feeding and harvesting ends, heat transferring surfaces, conveyor belts, air circulating housing and supporting base.
Figure 4A:
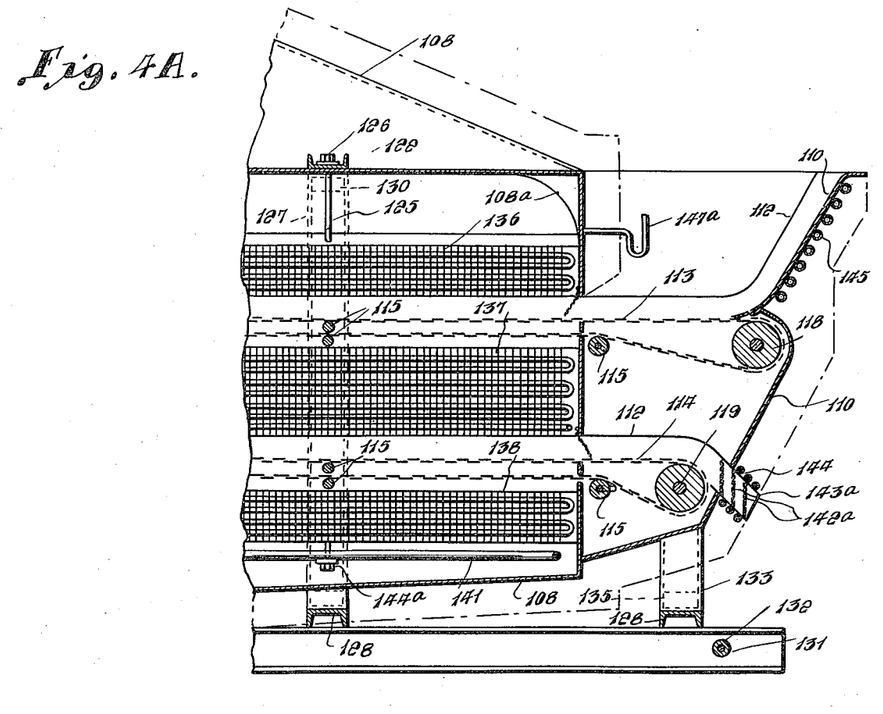
Figure 5:
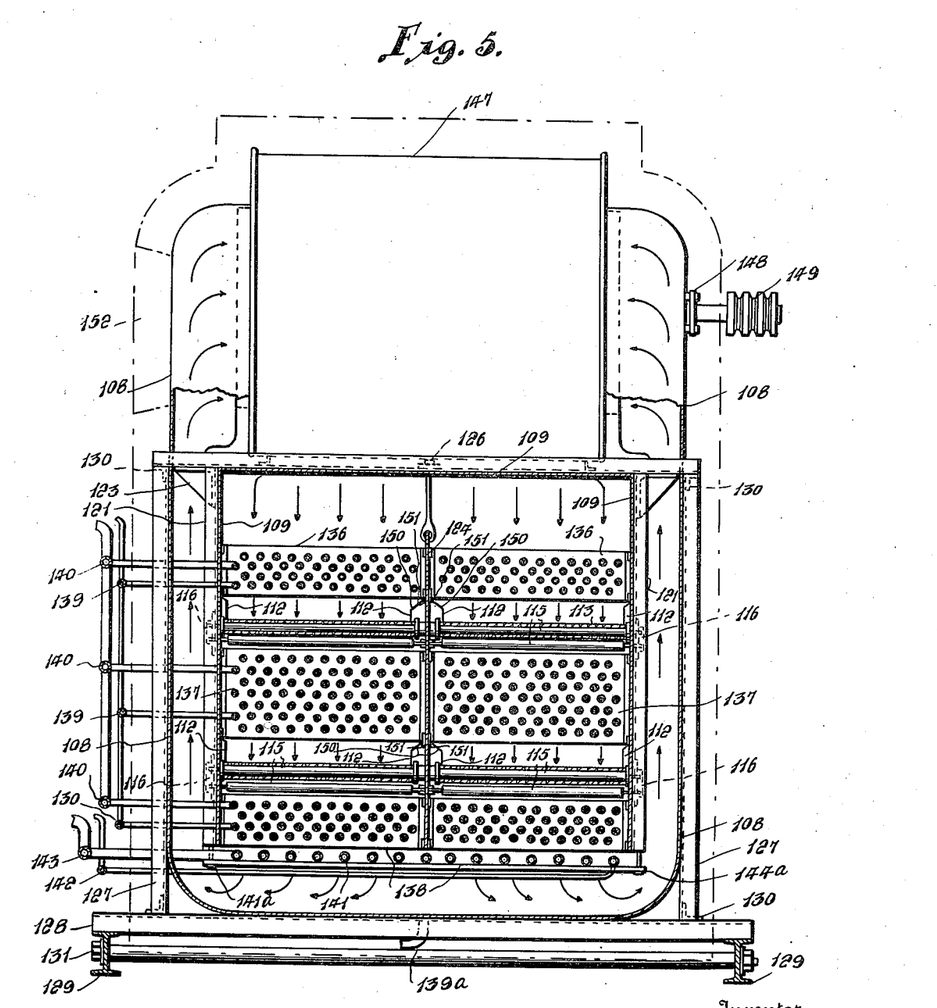
Figure 5 is a vertical cross-sectional view of the refrigerating apparatus shown in Figures 4 and 4A and shows arrangement of the air recirculating fan, air recirculating system and refrigerant connections.

In the form of apparatus shown in Figures 4, 4A and 5 it is intended to show and describe another form of apparatus in which the method of multistaging the air cooling and freezing is applicable and consists of external metal housing 108, air baffles 108a, internal metal housing 109 which is opened at the bottom, product feeding and harvesting air lockers 110, air locker 111, insulated removable cover 111a, air locker product guides and distributor 112, freezing conveyor belts 113, freezing conveyor belts 114, conveying belt supporting idler rollers 115, supporting roller bearings 116, driving pulleys and shafts 117, idler pulleys and shafts 118, driving pulleys and shafts 119 and idler pulleys and shafts 120, all materials and construction preferably the same as herein described for the apparatus shown in Figures 1 to 3.

The flexible couplings for driving pulleys, motor drives and motor foundations are not shown but are arranged and supported as herein shown and described for the apparatus shown in Figures 1 to 3. The internal housing 109 is secured to and supported by vertical channels 121 and horizontal cross channels 122 and additionally reinforced by angle pieces 123 preferably made of steel of welded construction. The vertical center supporting plate 124 has hanger rods 125 with lock nuts and washers 126 secured to horizontal cross channels 122. The external air circulating housing 108 and horizontal cross channels 122 are secured to and supported by vertical channels 127 which rest on and are secured to the horizontal base channels 128 which in turn rests on and is supported by the foundation base I beams 129. Vertical channels 128 are reinforced by angles 130, all material preferably made of steel and of welded construction. The foundation I beams are laterally reinforced by steel screw studs 131 with washers and nuts also distance pieces 132 between the I beams. Air lockers on each end of the apparatus are supported by channels 133 and 134 with reinforcing angles 135 preferably made of steel of welded construction.

The refrigerant air cooling evaporating coils 136, 137 and 138 arranged within the inner housing 109 so as to form an air delivery duct space at the top and return duct space at the bottom of the apparatus and the spaces between the external housing 108 and internal housing 109 on each side of the apparatus is utilized as return air ducts. The air cooling coils 136, 137 and 138 are also arranged to form two rectangular tubular spaces between the coils through which the product freezing conveyor belts 113 and 114 travel. The air cooling coils 136, 137 and 138 are secured to and supported by the internal housing 109 and the vertical division plate 124 and have refrigerant liquid feed connections 139 and refrigerant gas return connections 140. The coils are preferably made of steel arranged in one continuous length for each of the six sets as shown with the fin surfaces preferably arranged on approximate one inch centers and refrigerant connections 139 and 140 of steel pipe welded construction.

Recirculated air precooling coils 141 are arranged under the evaporating coils 138 and have refrigerant liquid feed connection 142, refrigerant gas return connection 143 and hanger supports 144a secured to vertical channels 121 with welded screw studs, lock nuts and washers. The precooling coils and connections are preferably made of steel pipe of welded construction with hangers of similar material. Drain pipe connection 139a is fitted to the bottom plate of external housing 108 as required to remove water from the apparatus when the heat transferring surfaces are being defrosted. Drain pipe connections are preferably made of steel of welded construction. Flexible metal air baffles 140a and 141a are fixed by screws to the product feeding and harvesting end of external housing 108. Baffles are preferably made of stainless steel wire links of close mesh and may be adjustable if desired. Similar air baffles 142a are fixed by screws to the frozen product harvesting nozzle 143a which is preferably made of stainless steel and hermetically sealed by welding to air locker 110. Warm water circulating coils 144 and 145 contact and extend over the external surfaces of the stainless steel housing section of air locker 110 where feeding of the product is accomplished also over the external surfaces of the harvesting nozzles 143a as required to warm the surfaces contacted and thereby prevent frost from accumulating on the internal surfaces. An adjustable stainless steel product guide 146 is arranged as shown in the air locker 111 and is preferably secured to the stainless steel guide 112 by adjusting screws with lock nuts.

The air recirculating fan 147 located on top of the apparatus and connected to the external housing 1 which forms the air return ducts on each side of the apparatus is secured to and supported by horizontal channels 122 preferably by bolts and lock nuts. The fan 147 is a double air inlet type receiving the return air on each side and discharging the recirculated air downwardly through the heat transferring surfaces and the product being treated. The fan driving shaft passes through one side of external housing 1 and is fitted with an air tight bearing gland 148 and V belt driving pulley 149 or shaft may be direct connected to an electric motor through a flexible coupling if desired. Air pressure regulating dampers 150 extend the full length of the rectangular freezing tube space between air cooling coil 136, 137 and 138 and are secured to the damper shafts 151 which extend through the air locker housing 111. The air pressure regulating damper shafts are formed square on the ends and fitted to a socket wrench as required for regulating the amount of recirculated air through the product pack being treated.

All external surfaces of the external housing including recirculating air fan are preferably insulated with sheet cork applied in the manner hereinbefore described for the apparatus shown in Figures 1 to 3.

In practicing the freezing method and in the operation of the apparatus shown in Figures 4 to 5 refrigerating effect is applied to the air precooling coils 141 through the liquid refrigerant connection 142 and the refrigerant gas will return to the refrigerant compressor through the refrigerant gas return connection 143. The air recirculating fan 147 is started and as the air passes over the air precooling coils 141 the temperature of the recirculated air is rapidly lowered and the moisture in the air is deposited in the form of frost on the precooling coil surfaces. When the recirculated air temperature is lowered to the optimum freezing temperature of the products being treated refrigerating effect is applied to all sections of the air cooling evaporating coils 136, 137 and 138 by liquid refrigerant connections 139, the refrigerant gas being returned to the compressor through the refrigerant gas return connections 140. Circulating water is then applied to the warming coils 144 and 145. The freezing conveyor belts 113 and 114 are started at the desired speed as required to completely freeze the products being treated during the passage through the apparatus. After stopping the air circulating fan the products are fed onto the moving conveyor belt 113 until the entire top surface of freezer conveyor belts 113 and 114 have been suitably filled, the conveyors are then stopped and the air recirculating fan 147 is started again. The air pressure regulating dampers 150 are adjusted and set as desired by referring to the air pressure indicated on the gauge 141a. When the product on the freezing belts have been frozen the freezing conveyor belts are again started and continuous feeding of the products and harvesting of the frozen products from the harvesting nozzles 143a results thereafter.

Upon completion of each freezing period the freezing conveyor belts are stopped, the products being treated on the belts are completely frozen, the fan is stopped and the belts are again started until all frozen products have been harvested from the apparatus. Refrigerant compressor is stopped and liquid refrigerant is shut off from air cooling coils 136, 137 and 138. The circulating water to warming coils 144 and 145 is shut off. An insulated cover preferably located at point 152 is opened, also removable insulated cover 111a is removed and the air pressure regulating dampers 150 are closed. The fan is then started and takes warm air from the surrounding atmosphere through opening at point 152 and discharges the arm air over the air cooling coils 136, 137 and 138, finally discharging the air into the atmosphere through air lock chambers 110 and 111. This operation rapidly removes the frost accumulation from the heat transferring surfaces of air cooling coils 136, 137 and 138 and the water resulting from the melting frost is drained from the apparatus in the same manner as hereinbefore described for apparatus shown in Figures 1, 2 and 3. After all surfaces have been defrosted, water drained from apparatus, fan shut off, insulated cover 111a and insulated cover at point 152 replaced and drain connections closed the apparatus is again ready to start operation for the next freezing period.

The freezing of the products being treated progresses in steps and is fully accomplished in two stages. The recirculated air is cooled in three stages, being cooled before and after each stage of freezing. The principal difference in the arrangement of the integral parts of the apparatus shown in Figures 4 to 5 as compared to the apparatus shown in Figures 1 to 3 is the use of top and bottom freezing conveyor belts 113 and 114 in the arrangement shown in Figures 4 to 5 which permits the feeding and harvesting of the product on the same end of the apparatus through transferring the product from the top belt 113 to the bottom belt 114 by gravitational effect, the product being directed by the adjustable product guides 146 and the product guides and distributors 112 onto the bottom freezing conveyor belts 114 where it is completely solidified before passing out through the harvesting nozzles 143a.

From the hereinbefore detailed description of the apparatus shown in Figures 1 to 3 together with its method of operation and advantageous results gained by the freezing method, the simple adaptation of the top and bottom freezing conveyors to operate in conjunction with this apparatus is believed to be obvious. This arrangement would further reduce the amount of air recirculation required approximately 50% while maintaining the same air temperature rise, thereby effecting a further saving in power. Moreover this arrangement permits the product to be fed and harvested on the same end which would effect a labor saving in some packing plants.

While the arrangement of the apparatus shown in Figure 5 provides for a single air circulating fan with double air intakes and return air ducts located on sides of apparatus, it is obvious that two fans may be used in conjunction with an extension of the vertical division plate 124 to the top and bottom of the external housing 108, thereby rendering two separate air recirculating chambers. Moreover the refrigerant feed and return connections 39, 40, 42 and 43 shown on one side of the apparatus may also be provided on the opposite side of the apparatus as may be required for independent temperature control of the air in each air recirculating chamber.

The horizontal arrangement of the refrigerant air cooling evaporating coils shown in Figures 1 to 5 may be rearranged in a vertical position on each side of the apparatus, and if desired, additional coils may be placed vertically in the center of the apparatus between the freezing conveyor belts. The air would then be recirculated horizontally across the freezing chambers above and below the freezing belts with the desired multistaging of the freezing and air cooling cycles accomplished through the use of air seals and baffles as hereinbefore shown and described for vertical recirculating air flow. While multistaging of the heat transferring cycles may be accomplished by air flowing horizontally over the product being treated, it is not as effective or desirable as the vertical air flow herein described since the horizontal air flow does not adequately penetrate the product pack on the freezing belts. The vertical air flow shown and described in Figures 1 to 3 penetrates the product on the freezing belts and a large volume of air passes through the product pack at a high velocity with the directional air flow reversed in each freezing stage. This condition breaks down the stagnant air film surrounding each individual piece of the product being treated thereby substantially increasing the rate of heat transfer and decreasing the time required to freeze the product being treated.

From the disclosure, drawings and detailed description of the invention it is believed that the construction and operation thereof will at once be apparent, it being noted that there is herein provided a novel method of refrigerating or freezing comestibles and the like combined with feeding, conveying and harvesting facilities. The refrigerating or freezing of comestibles being accomplished by multistaging the heat transfer required for treating the comestible and cooling the secondary heat transferring vehicle. While there are herein shown and described the preferred embodiments of the present invention, it is nevertheless to be understood that minor changes may be made therein without departing from the spirit and scope of the invention as claimed.

I claim:

1. In combined multistage fluid cooling and produce refrigerating apparatus, refrigerating devices comprising an inclosed casing, superposed endless product conveyor belts in the casing, a plurality of vertically alined uninterrupted heat transferring surfaces extending longitudinally of the casing and arranged in close relation above and below the product conveyor belts with a clear space between the heat transferring surfaces and said belts, fluid propelling means and means cooperating with said fluid propelling means to cause the fluid to move in two separate independent streams, each stream flowing in alternating contact with the heat transferring surfaces and the produce on said belts.

2. In combined multistage fluid cooling and produce refrigerating apparatus, refrigerating devices comprising an inclosed casing, endless product conveyor belts in the casing, feeding and harvesting means associated with the casing and belts, a plurality of vertically alined heat transferring surfaces extending longitudinally of the casing and arranged in close relation above and below the product conveyor belts and directly facing said belts, fluid propelling means and means cooperating with said fluid propelling means to cause the fluid to move in two separate independent streams, each stream flowing in alternating contact with the heat transferring surfaces and the produce on said belts and said streams then uniting for further passage through said fluid propelling means, means for regulating the quantity of recirculated fluid in contact with the produce, means for forecooling and dehumidifying the recirculated fluid and operable independently of the heat transferring surfaces and prior to the refrigeration of the produce without depositing frost on the heat transferring surfaces used for cooling the produce and means for eliminating frost accumulation on the exposed surfaces of the feeding and harvesting means.

3. In combined multistage fluid cooling and comestible refrigerating apparatus, refrigerating devices comprising an inclosed casing with means for feeding and harvesting the product, an endless product conveyor belt in the casing, a plurality of vertically alined heat transferring surfaces extending longitudinally of the casing and arranged in close relation above and below the product conveyor belt and directly facing the belt, means for propelling a fluid and discharging said fluid in a single stream, means cooperating with the fluid-propelling means for separating the single stream into two individual fluid streams, means to prevent the mixing of said individual fluid streams during their passage through separate series of heat transferring stages while alternately contacting each stream with the heat transferring surface and produce in said stages, the fluid-propelling means being operative to repeat the flow cycle of said fluid.

4. In combined multistage fluid cooling and comestible refrigerating apparatus, refrigerating devices comprising a substantially inclosed casing with means for feeding and harvesting the product, an endless product conveyor belt in the casing, heat transferring surfaces arranged in vertical alinement and in close relation above and below the conveyor belt and directly facing the belt, fluid-propelling means, a series of ducts and baffles cooperating with the fluid-propelling means for dividing said fluid into two individual streams and operative to prevent the mixing of said streams and to direct each stream through a separate series of heat transferring stages in alternate contact with the heat transferring surface and produce, the direction of flow of each individual stream in adjacent heat transferring stages being counter to each other.

5. In a combined multistage air cooling and produce refrigerating apparatus, refrigerating devices comprising an inclosed casing with means for feeding and harvesting the produce, a produce conveyor belt in the casing, a plurality of finned heat exchange surfaces arranged in close relation and in vertical alinement above and below said produce conveyor belt and directly facing the belt, fluid propelling means and means cooperating with said fluid propelling means to cause the fluid to move in two separate independent streams, each stream flowing in alternating contact with the heat exchange surfaces and the produce on said belt and said streams then uniting for further passage through said fluid-propelling means.

6. In combined multistage air cooling and produce refrigerating apparatus, refrigerating devices comprising an inclosed casing, means having inlet and outlet openings for feeding and harvesting the produce, a produce conveyor belt in the casing, a plurality of finned heat exchange surfaces arranged in close relation above and below the belt and in vertical alinement with said belt and directly facing the same, air propelling means and means cooperating with said air propelling means to cause the air to move in two separate and independent streams, each stream flowing in alternating contact with the heat exchange surfaces and the produce on said belt, means for regulating the quantity of air passing through the produce belt in each stage, means for forecooling and dehumidifying the recirculated air and operable independently of the heat exchange surfaces and prior to the refrigeration treatment of the produce without reducing the heat transfer efficiency of the heat exchange surfaces and means for eliminating frost accumulation on the exposed surfaces forming the inlet and outlet openings of the feeding and harvesting means.

7. In combined multistage air cooling and refrigerating apparatus, refrigerating devices comprising an inclosed casing, a single endless produce conveyor belt in the casing, means for feeding the produce onto the belt, means for discharging the produce from said belt and casing, a plurality of finned heat transfer surfaces arranged in close relation and in alinement with said conveyor belt at opposite sides thereof and directly facing the belt, means for propelling the air confined within the casing and delivering a single stream at the approximate center of the casing, means cooperating with the air propelling means for dividing said single air stream into two separate individual air streams, and means for conducting each individual air stream through a separate series of heat transferring stages in alternate contact with the heat transfer surfaces and produce in each successive stage, said last-named means being operative to effect the uniting of said individual air streams for passage through the air propelling means.

8. In combined multistage air cooling and produce refrigerating apparatus, refrigerating devices comprising an inclosed casing, a single endless produce conveyor belt in the casing, means for feeding produce onto the conveyor belt and means for discharging produce from said belt and casing, a plurality of finned heat transfer surfaces arranged in close relation and in vertical alinement above and below said conveyor belt and directly facing the belt, means for propelling the air confined within the casing and delivering a single stream at the approximate center of the casing, means cooperating with the air propelling means for dividing said single air stream into two separate individual air streams, means for conducting each individual air stream flowing through a separate series of heat transferring stages in alternate contact with the heat transferring surfaces and produce in each successive stage, said last-named means being operative to effect the uniting of said individual air streams for passage through the air propelling means, and means for by-passing a portion of each individual air stream in each heat transferring stage as required to distribute the optimum quantity of air through the produce in each stage.

9. In combined multistage air cooling and produce refrigerating apparatus, refrigerating devices comprising an inclosed casing, a single endless produce conveyor belt in the casing, means for feeding the produce onto the conveyor belt and means for discharging the produce from said belt and casing, a plurality of finned heat transferring surfaces arranged in close relation and in vertical alinement above and below said conveyor belt with a clear space between the heat transferring surfaces and said belt, means for propelling the air confined within the casing and delivering a single stream at the approximate center of the casing, means cooperating with the air propelling means and dividing said single air stream into two separate individual air streams with each individual air stream flowing through a separate series of heat transferring stages and in a counterdirection with respect to the direction of flow in the preceding stage, the individual air streams flowing in alternating contact with the heat transferring surfaces and the produce on said belt and said individual air streams being united after flowing through said separate sets of stages for further passage through said air propelling means.

10. A portable multistage food freezing apparatus comprising a substantially inclosing casing, a conveyor belt in the casing, means for feeding food onto the belt and means for discharging the food from the conveyor belt and casing, means associated with the feeding and harvesting means for the elimination of frost accumulation on the external exposed surfaces thereof, evaporators with extending heat transferring fin surfaces arranged in close relation and parallel with said food conveying belt and directly facing the belt, a fan for propelling the air confined within the casing and discharging said air in a single stream at the approximate center of the casing for circulation through the casing, means for forecooling and dehumidifying the recirculated air and operable independently of said evaporators and prior to food freezing operations, a series of ducts and baffles cooperating with the air propeller fan for dividing the discharged single air stream into two separate and individual air streams and for directing the flow of each individual air stream through a separate series of heat transferring stages for alternate contact with the heat transferring surfaces and the food.

11. A method of freezing food and the like consisting of initially forecooling and dehumidifying a volume of air, thereafter dividing said air into multiple individual streams, flowing each individual stream through a series of separate heat transferring zones, and alternating the steps of cooling each separate air stream in said zones with the steps of causing the air to absorb heat from the foods in said zones and repeating the flow cycle of said volume of air.

12. A method of freezing food and the like consisting of confining and recirculating a constant volume of air, dividing said air into multiple individual streams, separately flowing said individual streams respectively through separate series of heat transferring zones in which the direction of flow in each successive zone of a series is counter to the direction of flow in the preceding zone and alternating the steps of cooling each individual stream in said zones with the steps of causing the air to absorb heat from the foods in said zones and recirculating said volume of air.

13. A method of freezing comestibles and the like consisting of confining and recirculating a constant volume of air for precooling and dehumidifying said air, then delivering said recirculated air in a single stream at the approximate center of heat transferring zones through which comestibles are moved, then dividing said stream into two separate and individual air streams which are directed through separate series of heat transferring zones and alternating the steps of cooling each separate stream in said zones with the steps of causing the air to absorb heat from the comestibles in said zones as the comestibles are progressively frozen, and reuniting said separate streams of air for repeated cycle flows.

14. A method of refrigerating foods and the like consisting of initially conditioning a confined volume of air in a series of heat transferring zones by removing the required heat and moisture from the air without depositing frost on a surface used to remove heat while treating food, then feeding foods to be treated into and through the series of heat transferring zones, recirculating the preconditioned air to centrally located zones, dividing the air at the central zones into separate and individual air streams for independent flow through separate successive heat transferring zones, regulating the quantity of air in each stream as it flows through a zone for contact with the food, alternating the steps of cooling each separate stream in said zones with the steps of causing the air to absorb heat from the foods in said zones as the temperature of the food is progressively lowered in the successive heat transferring zones, and repeating the cycle flow of said streams of air.

15. A method of refrigerating foods and the like consisting of successively feeding the material into a series of heat transferring zones, initially introducing a recirculated air to the centrally located zones, then dividing the air into separate and individual air streams, flowing the individual air streams respectively through separate successive heat transferring zones in a counter direction with respect to the direction of flow in each preceding zone, alternating the steps of cooling each separate stream in said zones with the steps of causing the air to absorb heat from the material in said zones as the material is progressively refrigerated to the desired temperature, and recirculating said air.

16. A multistage method of refrigerating foods and the like consisting of moving foods through a series of heat transferring zones, initially subjecting the food to the flow of an individual air stream successively flowing through said zones, alternating the steps of cooling said stream in said zones with the steps of causing the air to absorb heat from the foods in said zones, then moving the foods through a second series of heat transferring zones and subjecting the food moved therethrough to the flow of another individual air stream successively flowing through the second series of zones, alternating the steps of cooling said last named stream in said second series of zones with the steps of causing the air to absorb heat from the foods in said second series of zones, and recirculating the air for independent flow through the respective series of heat transferring zones.

17. A method of refrigerating foods and the like by multistage heat transfer consisting of moving food through a series of heat transferring zones, initially subjecting the food to contact with an individual air stream flowing through a heat transferring zone, thereafter contacting the food with the same individual air stream in its passage through a second heat transferring zone and alternating the steps of cooling the air stream in said zones with the steps of causing the air to absorb heat from the foods in said zones.

18. A method of multistage refrigerating of foods consisting of initially subjecting the food to the flow of an individual and unmixed air stream successively flowing through a series of heat transferring zones, alternating the steps of removing a part of the heat from the individual air stream with the steps of causing the individual air stream to absorb a part of the heat from the food in each zone, and thereafter subjecting the food to the flow of a second individual and unmixed air stream successively flowing through a separate series of heat transferring zones and alternating the steps of removing a part of the heat from the second individual air stream with the steps of causing said air stream to absorb a part of the heat from the food in each zone of said second series of zones as the food is progressively refrigerated to the desired temperature.

19. A method for multistage refrigerating of foods consisting of initially subjecting the food to the flow of an individual and unmixed air stream successively flowing through a series of heat transferring zones, alternating the steps of removing a part of the heat from the individual air stream with the steps of causing said air stream to absorb a part of the heat from the foods in each zone, thereafter subjecting the food to the flow of a second individual and unmixed air stream successively flowing through a separate series of heat transferring zones, alternating the steps of removing a part of the heat from the second individual air stream with the steps of causing said second individual air stream to absorb a part of the heat from the foods in each zone in said second series of zones, regulating the contact of the air in each air stream with the food in each zone of the two series as the food is progressively refrigerated to the desired temperature and recirculating individual air streams through both of said series of zones.

20. A method for multistage refrigerating of foods consisting of initially subjecting the food to the flow of an individual and unmixed air stream successively flowing through a series of heat transferring zones, alternating the steps of removing a part of the heat from the individual air stream with the steps of causing said air stream to absorb a part of the heat from the foods in each zone, thereafter subjecting the food to the flow of a second individual and unmixed air stream successively flowing through a separate series of heat transferring zones, alternating the steps of removing a part of the heat from the second individual air stream with the steps of causing said second individual air stream to absorb a part of the heat from the foods in each zone in said second series of zones, by-passing a portion of the air in each individual air stream around the food in each zone as the food is progressively refrigerated in stages to the desired temperature and recirculating individual air streams through both of said series of zones.

WILLIAM J. FINNEGAN.